Jan. 17, 1967  M. A. VAN DAMME-VAN WEELE ET AL  3,298,796
CRYSTALLIZATION OF HYDROSULFITE
Filed May 19, 1964
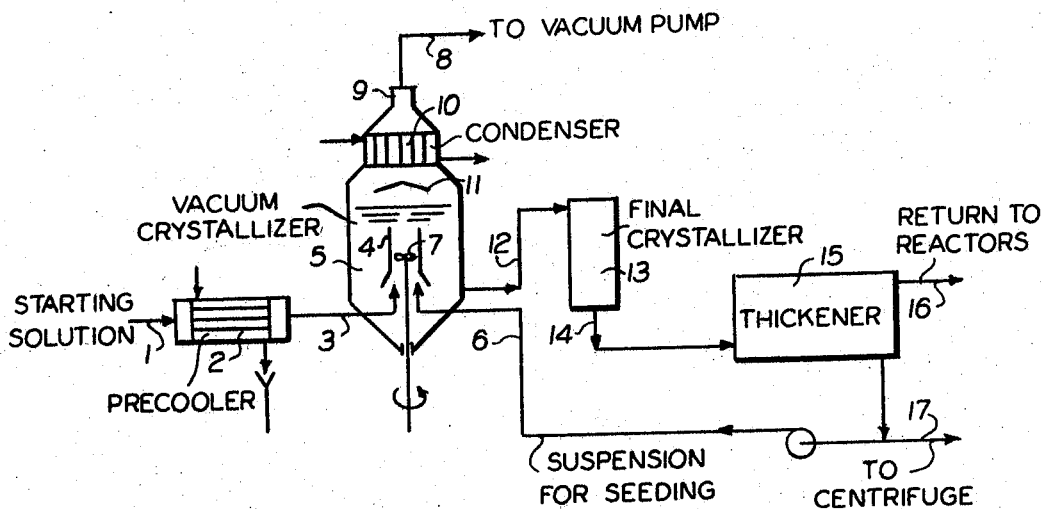
INVENTORS
Marina Andriana Van Damme-Van Weele
Arie Pieter Van der Molen
BY
ATTORNEYS.

United States Patent Office 3,298,796
Patented Jan. 17, 1967

3,298,796
CRYSTALLIZATION OF HYDROSULFITE
Marina Adriana van Damme-van Weele and Arie Pieter van der Molen, Hengelo, Netherlands, assignors to N.V. Koninklijke Nederlandsche Zoutindustrie, Hengelo, Netherlands
Filed May 19, 1964, Ser. No. 368,643
Claims priority, application Netherlands, May 31, 1963, 293,550
6 Claims. (Cl. 23—302)

This invention relates to a process of recovering alkali metal dithionite from a solution obtained in preparing alkali metal dithionite and containing an alcohol (which reduces the solubility of the dithionite) wherein the solution is cooled for crystallizing alkali metal dithionite dihydrate and wherein the solution is seeded by recycling crystals obtained before to the crystallization apparatus.

Such a process is known, for example, from the U.S. Patent 2,938,771. According to this specification a dithionite solution containing alcohol is cooled by mixing with a large amount of recycled crystal suspension serving as seeding material. The mixture is passed from the mixing and crystallization vessel to a heat exchanger and flows from this device to a thickener wherein a separation between crystal-free mother liquor and crystal suspension takes place. As said hereinbefore, part of the crystal suspension is recycled to the mixing vessel and the remaining part is fed to a centrifuge or filter for recovering the crystals.

One of the most difficult things in such a process is obtaining a crystal suspension which can be centrifuged or filtered easily. As a matter of fact, one has to find a compromise between obtaining crystals which are as large as possible, for which a rather long time is required, and limiting the decomposition which, in general, is reduced as the crystallization time is shorter.

Apart from these conflicting conditions there are other factors, such as the formation of new crystals by spontaneous nucleation and attrition, economically acceptable dimensions of the apparatus (which influence the residence times) etc. which interfere with obtaining a crystal mass which can be separated easily.

It has now been found that relatively large crystals can be obtained in a short time if, in accordance with this invention at least the last part of the cooling operation is effected by vacuum cooling while maintaining substantially constant the alcohol content of the solution.

By maintaining constant the alcohol content, which, for instance, can be effected by condensing and returning the evaporated liquid that mainly consists of alcohol, the reduced solubility of the dithionite in the alcoholic medium is retained. The use of vacuum cooling instead of cooling by heat exchange through a wall results in a considerable repression of spontaneous nucleation and attrition of the seed crystals. In the first place this is due to the fact that during vacuum cooling the solution is not in contact with a large wall surface.

In view of the costs the first part of the cooling step generally will be carried out by means of a heat exchanger; in this case the temperature can be lowered to a value at which no danger of spontaneous nucleation exists. Seeding the solution will then take place after the preliminary cooling operation, preferably prior to vacuum cooling.

Contrary to the general directives for crystallizing dissolved substances, which among others imply that for obtaining relatively large crystals measures have to be taken to have a small supersaturation in the solution, the vacuum cooling step according to this invention is preferably effected so rapidly and circulation and mixing in the cooling and crystallization apparatus are limited to such an extent that in the cooling zone the solution reaches a supersaturation of at least 8 gs., preferably of at least 9.5 gs. of dithionite per liter.

In carrying out the process according to this invention the best results are obtained if the amount of seeding material added is limited considerably; this again is contrary to the usual practice in recovering large crystals. According to this invention, preferably seed crystals are added to the solution in such an amount only that the suspension density of the seeded solution is not more than 100 gs. of crystals per liter. In particular a suspension density of from 35 to 50 gs. per liter can be used.

In the following example which illustrates the invention and refers to the drawing the starting solution is a solution of sodium dithionite obtained by reacting sodium amalgam with a sodium bisulfite solution, as is described in the U.S. Patent 2,938,771. However, the process according to this invention can also be used for crystallizing alkali metal dithionite from solutions obtained continuously or not in a different manner, for example, by converting zinc dithionite with alkali metal hydroxide or carbonate.

EXAMPLE

The starting solution discharged from a number of production reactors in an amount of 15 m.$^3$ per hour contained 20% of ethanol and 32 gs. of $Na_2S_2O_4$ per liter. This solution was supplied to the crystallization device through conduit 1 and was cooled first by well water in heat exchanger 2 to 14° C., no crystallization of dithionite occurring at this temperature. The solution was introduced into central tube 4 of vacuum crystallizer 5 through conduit 3, together with 3 m.$^3$ of crystal suspension per hour. This suspension supplied through conduit 6 and coming from a thickener 15 contained 280 gs. of dithionite hydrate crystals per liter.

Circulation pump 7 having a capacity of 25 m.$^3$ per hour pumped the mixture together with 7 m.$^3$ of circulating suspension through tube 4 upwards to the cooling zone, that is to say to the zone adjacent the surface of the suspension contained in the crystallizer, where the mixture was cooled rapidly to 5° C. by vacuum cooling. Between the liquid level and suction outlet 9 connected to vacuum conduit 8 there was a cooler 10 for condensing the evaporated liquid. This liquid flowed back into the solution over plate 11. In this manner the alcohol content was not reduced essentially.

In the vacuum cooling zone the mixture reached a supersaturation of dithionite of about 11 gs. per liter since no substantial crystallization could take place during the short time of passing this zone.

During passing the crystallization zone of the vacuum crystallizer situated below the cooling zone 201 kgs. of $Na_2S_2O_4$ crystallized, forming 242 kgs. of hydrate crystals. Per hour 18 m$^3$ of crystal suspension were discharged from the crystallizer through conduit 12. This suspension containing 60 gs. of hydrate crystals and 18 gs. of dissolved dithionite per liter was introduced into final crystallizer 13 wherein still 65 kgs. of hydrate crystals crystallized. The suspension discharged from the final crystallizer and containing 63.6 gs. of hydrate crystals and 15 gs. of dissolved dithionite per liter was passed through conduit 14 to thickener 15, from which 13.9 m.$^3$ of clear supernatant per hour were discharged through conduit 16. This liquid was returned to the reactors (not shown).

As mentioned hereinbefore, per hour 3 m.$^3$ of the thickened crystal suspension serving as seeding material were pumped through conduit 6 to the vacuum crystallizer. 1.1 m.$^3$ of the thickened suspension were passed through conduit 17 to a centrifuge, wherein 306 kgs. of hydrate crystals were separated. The crystals could be centrifuged easily. They could be dehydrated to form anhydrous sodium dithionite in the usual manner. The centrifugate was returned to the reactors.

The preferred embodiment of the invention has been illustrated and described, but changes and modifications can be made, and some features can be used in different combinations without departing from the invention as defined in the claims.

What is claimed is:

1. In a process of crystallizing alkali metal dithionite dihydrate from an aqueous solution obtained in preparing alkali metal dithionite and containing an alcohol, the steps of
   (a) seeding said solution by adding part of a thickened dihydrate crystal slurry, obtained subsequently in the process, to said solution in a volume less than that of said solution,
   (b) exposing the mixture of said solution and said slurry to a reduced pressure so as to effect cooling thereof by evaporation of liquid from said mixture while maintaining the amount of alcohol substantially constant during vacuum cooling by condensing the alcohol at the top of the vacuum cooling region as the alcohol evaporates, and returning the alcohol to the mixture and suspension in the vacuum cooling region,
   (c) passing the thus cooled mixture through a crystallization zone so as to effect crystallization of alkali metal dithionite dihydrate therefrom,
   (d) separating said mixture in a thickening zone into a thickened crystal slurry and a substantially clear supernatant solution, and
   (e) returning part of the slurry to the new solution for the initial seeding step.

2. A process as defined in claim 5, further comprising the step of precooling said solution, prior to the seeding with said crystal slurry, by indirect heat exchange to a degree insufficient to effect spontaneous nucleation in said solution.

3. In a process of crystaillizing alkali metal dithionite dihydrate from an aqueous solution obtained in preparing alkali metal dithionite and containing an alcohol, said solution containing approximately 20% alcohol, adding to said mixture a suspension of seeding material from a subsequent step of the process, the amount of suspension added to the mixture being less than the amount on said material by weight, cooling the combined mixture and suspension by vacuum cooling to a temperature of about 5° C., maintaining the amount of alcohol substantially constant during vacuum cooling by condensing the alcohol at the top of the vacuum cooling region as the alcohol evaporates, and returning the alcohol to the mixture and suspension in the vacuum cooling region, discharging the combined mixture and suspension from the vacuum cooling region to a final crystallizer zone and discharging the material from the final crystallizer zone to a thickener region, thickening the material in the thickener region to a clear supernatant liquid and a suspension of dithionite dihydrate, continuously removing a minor part of the suspension from the thickener region to obtain the final sodium dithionite product, and continuously supplying the rest of the suspension from the thickener back to the vacuum cooling region as seeding material.

4. A process as defined in claim 1 characterized by cooling said solution by indirect heat exchange to a degree insufficient to effect spontaneous nucleation in said solution, and seeding the solution with slurry having a suspension density of 35 to 50 grams per liter.

5. The process described in claim 3 characterized by the original solution containing approximately 32 grams $Na_2S_2O_4$ per liter, the suspension added to the mixture containing approximately 280 grams $Na_2S_2O_4$ per liter, the mixture being discharged from the vacuum cooling region to the final crystallizer containing 60 grams of dihydrate crystals and 18 grams of dissolved dithionite per liter, and the suspension after separation and thickening in the thickener region having approximately 280 grams $Na_2S_2O_4$ per liter.

6. The process described in claim 5 characterized by the ratio of seeding suspension to other mixtures being approximately 1 to 5, precooling the solution ahead of the vacuum cooling region to a temperature insufficient to effect spontaneous nucleation in said solution, maintaining the alcohol content substantially constant by condensing the alcohol that evaporates from the vacuum cooling region and returning the condensed alcohol directly back to the combined mixture and suspension in the vacuum cooling region, and continuously removing approximately 27% of the suspension from the thickener region for subsequent treatment to obtain the final sodium dithionite product while returning approximately 73% of the suspension back to the vacuum cooling region as seeding material.

References Cited by the Examiner

UNITED STATES PATENTS

| | | |
|---|---|---|
| 1,976,204 | 10/1934 | Voorhees et al. |
| 1,988,768 | 1/1935 | Aldridge _____ 62—58 X |
| 2,886,603 | 5/1959 | Shelton. |
| 2,938,771 | 5/1960 | Avedikian _____ 23—302 X |
| 3,024,117 | 3/1962 | Barlow. |

NORMAN YUDKOFF, *Primary Examiner.*

G. P. HINES, *Assistant Examiner.*